US006895512B1

(12) United States Patent
Calbucci

(10) Patent No.: US 6,895,512 B1
(45) Date of Patent: May 17, 2005

(54) METHODS AND SYSTEMS FOR SYNCHRONIZING SECURITY DESCRIPTORS IN SYSTEMS THAT USE MULTIPLE SECURITY DESCRIPTOR SPECIFICATIONS

(75) Inventor: Marcelo A. F. Calbucci, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 09/609,197

(22) Filed: Jun. 30, 2000

(51) Int. Cl.$^7$ .............................................. G06F 15/16
(52) U.S. Cl. ...................... 713/201; 709/246; 709/249; 707/102; 707/103; 707/201
(58) Field of Search ......................... 713/201; 709/246, 709/249; 707/103, 201

(56) References Cited

U.S. PATENT DOCUMENTS

| | | | | |
|---|---|---|---|---|
| 5,884,323 | A | * | 3/1999 | Hawkins et al. ............. 707/201 |
| 6,061,740 | A | * | 5/2000 | Ferguson et al. ........... 709/246 |
| 6,308,181 | B1 | * | 10/2001 | Jarvis .......................... 707/102 |
| 6,385,618 | B1 | * | 5/2002 | Ng et al. ................. 707/103 Y |
| 6,438,563 | B1 | * | 8/2002 | Kawagoe ..................... 707/201 |
| 6,446,075 | B1 | * | 9/2002 | Velasco ....................... 707/102 |
| 2002/0107837 | A1 | * | 8/2002 | Osborne et al. ............... 707/2 |
| 2002/0156798 | A1 | * | 10/2002 | Larue et al. ................ 707/201 |

* cited by examiner

*Primary Examiner*—Emmanuel L. Moise
*Assistant Examiner*—Carl G. Colin
(74) *Attorney, Agent, or Firm*—Workman Nydegger

(57) ABSTRACT

Methods and systems are disclosed for replicating security descriptors that describe security rights to the same object even though those security descriptors may follow different security descriptor specifications. As an example, the replication may occur between a first security descriptor that follows a first security descriptor specification and a second security descriptor that follows a second security descriptor specification. In order to replicate changes to the first security descriptor with the second security descriptor, the first security descriptor is converted into a version of the first security descriptor that follows the second security descriptor specification. This version is then compared to the second security descriptor. Any detected changes are then made to the second security descriptor. The conversion may be accomplished using mapping rules that map sets of one or more rights of the first security descriptor specification to sets of one or more rights of the second security descriptor specification.

25 Claims, 10 Drawing Sheets

METHODS AND SYSTEMS FOR SYNCHRONIZING SECURITY DESCRIPTORS IN SYSTEMS THAT USE MULTIPLE SECURITY DESCRIPTOR SPECIFICATIONS

BACKGROUND OF THE INVENTION

1. The Field of the Invention

The present invention relates to the field of computer networks. In particular, the present invention relates to methods and systems for synchronizing security descriptors in computer networks that use multiple security descriptor specifications.

2. The Prior State of the Art

In the context of computers, security is often defined as the prevention of unauthorized use of an object. Such objects may include documents, databases, user objects, mailboxes, executables and the like.

In order to prevent unauthorized use of an object, prior to allowing a requested use of the object, computer systems typically authenticate the requesting entity to obtain a reasonable degree of security that the requesting entity is what it purports to be. Once the requesting entity is authenticated, the computer system refers to security information called "security descriptors" (also called "access control lists") that describe the requesting entity's rights to use the object. If the security descriptor expressly or implicitly indicates that the requested use is unauthorized for the requesting entity, then the computer system typically does not allow the requested use of the object to the requesting entity. Otherwise, if the security descriptor expressly or implicitly indicates that the requested use is authorized for the requesting entity, then the computer system typically allows the requested use of the object to the requesting entity. Thus, current security mechanisms rely heavily on security descriptors that define user rights to objects.

Different programs may define the same rights differently using different security descriptors. So long as the program controlling use of an object is able to interpret a security descriptor properly, the program should also be able to properly control the use of the object. Some programs may recognize one specification for interpreting security descriptors while another recognizes an entirely different security descriptor specification. For example, the MICROSOFT® WINDOWS NT® workstation 4.0 and server 4.0 operating systems recognize a security descriptor specification called herein the "4.0 specification." In contrast, the MICROSOFT® WINDOWS® 2000 operating system recognizes a significantly different security descriptor specification that is used by the ACTIVE DIRECTORY™ and is called herein the "Active Directory specification." The relevant points of each of these security descriptor specifications will now be described.

Typically, security descriptors include one or more ACEs or "Access Control Entries", each ACE including a security principle identifier (e.g., a user, group, or computer) followed by list of rights that apply to that security principle identifier. In the 4.0 specification, the ACEs include a field of 32 bits often called an "access mask", each bit in the access mask representing a flag that defines a certain right. If the flag is set high, that means that the right is allowed for the associated security principle. This type of ACE is often called a "standard" ACE since the ACE is not in the form of an object. In order to avoid confusion with other elements in this application labeled "standard", these "standard" ACEs will be referred to as "non-object" ACEs in this description and in the claims.

The Active Directory specification may also include security descriptors that have "non-object" ACEs which include a similar access mask associated with a security principal identifier. However, in the Active Directory specification, security descriptors may also be in the form of an object that defines rights using a GUID or "Globally Unique Identifier", each GUID representing an individual right. Since the number of GUIDs that may be used to identify rights is essentially limitless, numerous individual rights may be associated with a security principle identifier. Thus, the Active Directory specification permits for fine-grained control over security permissions. The GUID ACEs are often referred to as "Object ACEs" since they are in the form of an object.

Often, different security descriptors exist in a common network. This type of network will be referred to as a "security heterogenic network". For example, one device in the network may run the MICROSOFT® WINDOWS® 2000 operating system thus representing security rights to objects using the Active Directory specification. On the other hand, another device in the network may run either the MICROSOFT® WINDOWS NT® workstation 4.0 and server 4.0 operating systems thus representing security rights to objects using the 4.0 specification. In networked computer systems, it is common for many devices to represent the security rights associated with an object even if the device does not locally contain the object. Thus, in security heterogenic networks, security rights to the same object may be represented by different security descriptors that follow different security descriptor specifications.

It is important to any security system that rights granted to a given object be accurately and consistently represented across each device in the network at any given point in time. Otherwise, security permissions may differ depending on the device accessing the object on behalf of the requester. However, such accurate and consistent representation across security heterogenic networks is difficult due to the heterogenic nature of the network using different security descriptor specifications. Accordingly, methods and systems are desired for accurately and consistently representing or "synchronizing" security descriptors even in security heterogenic networks such as those that use both the 4.0 specification and the Active Directory specification.

SUMMARY OF THE INVENTION

The present invention includes methods and systems for replicating, in a non-degenerative fashion, security descriptors in a security heterogenic network which uses different security descriptor specifications to describes security permissions to the same object. An example of a security heterogenic network includes a network that uses both the 4.0 security descriptor specification described above and the Active Directory security descriptor specification also described above to describe security rights to the same object.

The method may be implemented in whole or in part by a converter module that acts as a link between security descriptors that follow one security descriptor specification in describing security rights to a given object and security descriptors that follow another security descriptor specification in describing that given object.

Initially, the first security descriptor that follows the first security descriptor specification is converted into a version of the first security descriptor that follows the second security descriptor specification. In order to accomplish this, the converter module has access to mapping rules that define mappings of sets of one or more rights of the first security descriptor specification with corresponding sets of one or more rights of the second security descriptor specification. The mappings preferably links rights that have equivalent security meanings so that security descriptors that described security rights to the same object to not represent inconsistent rights to that object.

For each right (or set of rights) for which there is a corresponding mapping rule, the converter converting the right that follows the first security descriptor specification to a corresponding right (or set of rights) that follows the second security descriptor specification. The converter then assembles all of the converted rights to form the version of the first security descriptor that follows the second security descriptor specification. Thus, at the immediate conclusion of this conversion, there are two versions of the first security descriptor, one that follows the first security descriptor specification and one that follows the second security descriptor specification.

The converter then compares the version of the first security descriptor that follows the second security descriptor specification with the second security descriptor that also follows the second security descriptor specification. The comparison is simplified since both compared security descriptors follow the same second security descriptor specification. For each right or set of rights for which there is a corresponding mapping rule, the converter compares the right in the version of the first security descriptor that follows the second security descriptor specification to the right in the second security descriptor. Based on this comparison, the converter detects changes in the first security descriptor that are not reflected in the second security descriptor. Subsequently, these changes are made to the second security descriptor so that the first and second security descriptors are again brought back into synchronization at least so far as the mapping rules are concerned.

This method may be repeated periodically or after one or more changes so that at any given moment, it is highly likely that the security descriptors that follow the first security descriptor specification are consistent with the security descriptors that follow the second security descriptor specification even though any of the security descriptors may change over time.

An advantage of this method is that access to any given object is governed by consistent security rights no matter what the security descriptor specification of the security descriptor consulted to determine those rights. Thus, security remains consistently applied even in security heterogenic networks.

In addition, the conversion between the two security descriptor specifications is non-degenerative. For example, one can make a change to the first security descriptor that is replicated to the second security descriptor. Subsequently, the change to the second security descriptor can be undone thus replicating the undoing of the change to the first security descriptor. The method results in the first security descriptor being returned to its initial state rather than to a state in which some information is lost.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to both methods and systems for synchronizing security descriptors in security heterogenic networks such as those that use both the 4.0 security descriptor specification described above and the Active Windows security descriptor also described above.

The embodiments of the present invention may comprise a special purpose or general purpose computer including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
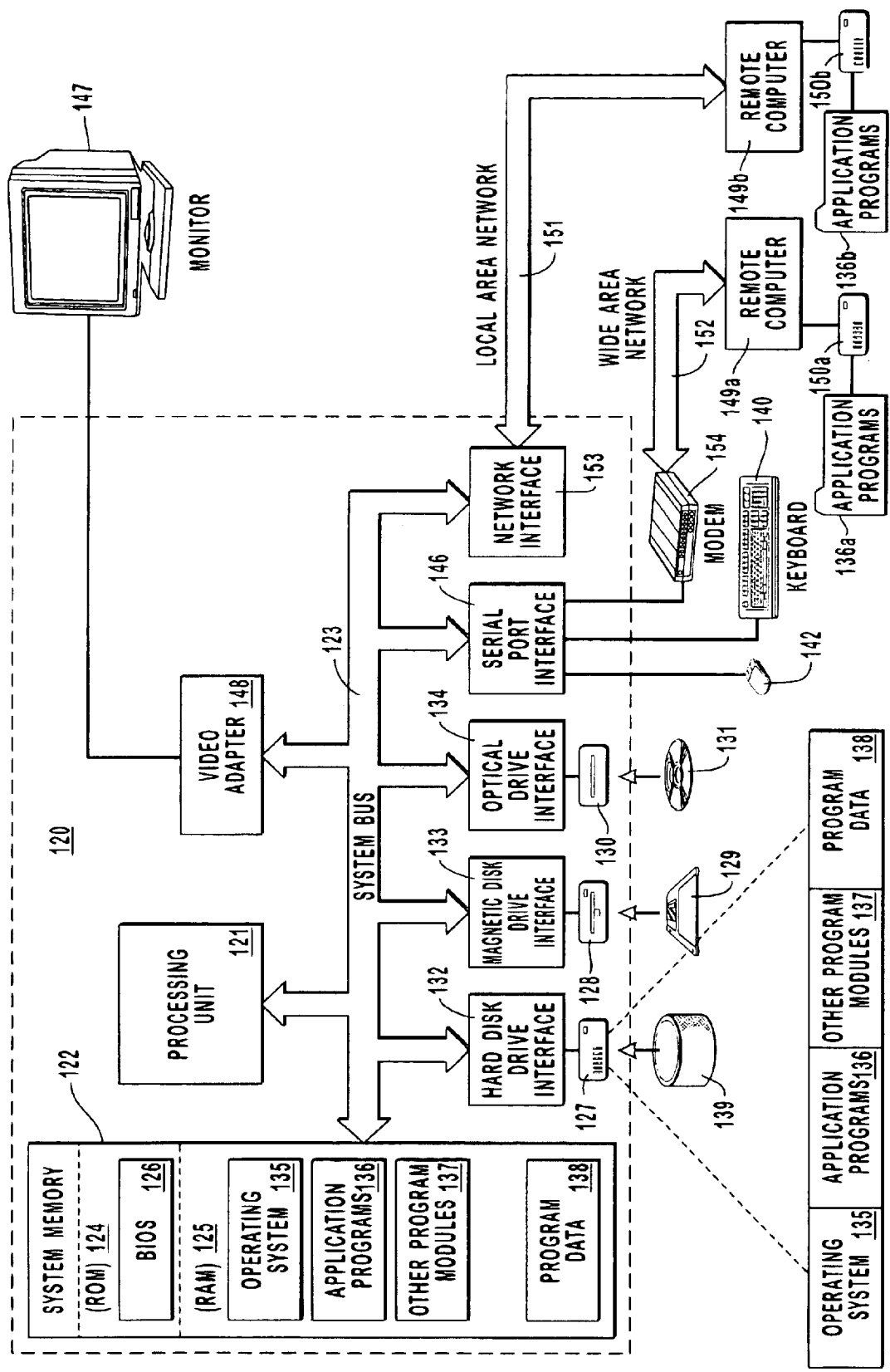
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the magnetic hard disk 139, removable magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
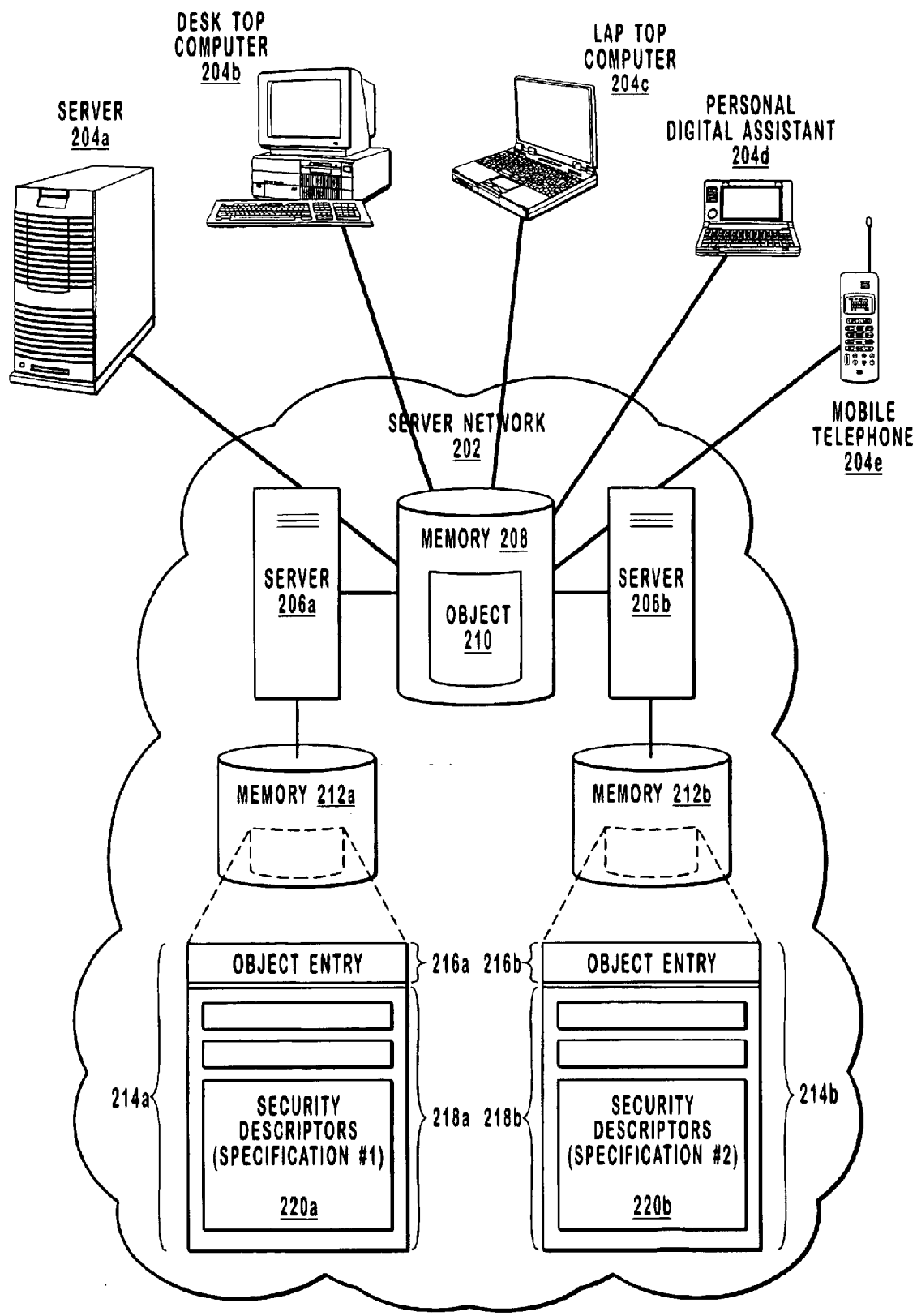
FIG. 2 schematically illustrates an example security heterogenic computer network environment in which the present invention may operate.

FIG. 2 illustrates a suitable example network environment including a server network 202 in which the present invention may be implemented. The server network 202 includes a two or more servers including servers 206a and 206b that can each independently control the use of an object such as object 210. For example, any of computers systems 204a through 204e or users thereof may request a certain use of the object 210. In response, either the server 206a or the server 206b will respond to the request by facilitating or blocking the use of the object 210 as appropriate.

For example, the server network 202 may be a server cluster that is designed to perform work as a single unit as though the server cluster was a single powerful server. Typically, the server cluster performs appropriate load balancing such that if one server is out of operation or overloaded, then task are assigned to other servers within the server cluster. Thus, the selection of which server 206 responds to the request and thus controls use of the object 210 may be entirely out of the control of the requesting entity. In other instances, the requesting entity may be able to select which server 206 responds to the request. In either case, it is desirable that the use of the object is controlled as uniformly as possible regardless of the server that actually responds to the request.

As mentioned above, the server network 202 is connectable to one or more computer systems 204, each requesting computer system 204a through 204e being capable of making a request for objects such as documents and executable files maintained by the server network 202. As an example, these requesting computer systems 204 may include other server computer systems such as server 204a, or client computer systems such as desk top personal computer 204b, lap top computer 204c, personal digital assistant 204d and/or mobile telephone 204e. The servers 206 and the requesting computers 204 may be structure with varying degrees of similarity to the structure of computer 120 described above and may potentially include some or all of the elements described above for computer 120.

The memory device such as memory device 208 that stores the object may be any memory device that the servers 206 have access to. By way of example, the memory device 208 may include any of the memory device described above for FIG. 1 including ROM 124, RAM 125, removable magnetic disk 129, removable optical disk 131, magnetic hard disk 139 or any other memory device. In some cases, the memory device 208 may represent multiple memory devices as when the object 210 is replicated or cached on several memory devices in order to allow the server network more efficient access to the object. The object 210 may essentially be any data structure including document files, executable files and so forth.

Server networks often have security mechanisms that prevent unauthorized use of an object. Such security mechanisms often include requiring the requesting entity (such as a computer system or user thereof) to authenticate their identity to the server network. Thus, server networks clusters may determine that the requesting entity is indeed what the requesting entity purports to be. Otherwise, the requesting entity could falsely claim to be an entity that has sensitive access privileges.

Once authenticated, the server network may impose certain restrictions on the use of the object depending on the permissions granted or denied to that particular requesting entity. In FIG. 2, if the request is handled by the server 206a, then the server 206a consults a data compilation 214a stored on a memory device 212a to determine the security permissions of the requesting entity relevant to the object 210. If the request is handled by the server 206b, then the server 206b consults a data compilation 214b stored on memory device 212b to determine the security permissions of the requesting entity relevant to the object 210. The data compilation may be a directory or any other compilation capable of storing security information regarding objects. Although the memory devices 212a, 212b and 210 are shown as being separate memory devices in FIG. 2, one or more or all of these memory devices may actually be the same physical device.

Each data compilation 214 includes object entries describing properties related to different objects including the object 210. For example, the data compilation 214a includes an object entry 216a that corresponds to the object 210. The object entry 216a includes a number of properties 218a related to the object including security descriptors 220a that follow a first security descriptor specification (i.e., "SPECIFICATION #1"). For example, the first security descriptor specification may be the 4.0 security descriptor specification described above. The server 206a consults the security descriptors 220a to determine security permissions of the requesting entity relevant to the object 210.

The other data compilation 214b includes an object entry 216b that also corresponds to the same object 210. The object entry 216b also includes a number of properties 218a related to the object including security descriptors 220b. However, the security descriptors 220b differ from the security descriptors 220a in that the security descriptors 220b follow a second security descriptor specification (i.e., "SPECIFICATION #2"). For example, the second security descriptor specification may be the Active Directory specification described above. The server 206b consults the security descriptors 220b to determine security permissions of the requesting entity relevant to the object 210.

The server network 202 is thus a security heterogenic computer network. In this description and in the claims, a network in which different security descriptor specifications are used when determining security permissions is referred to as a "security heterogenic computer network". A security heterogenic computer network may occur when different software is running on the servers within the network. For example, some of the server such as server 206*a* may be running MICROSOFT® WINDOWS NT® workstation 4.0 or server 4.0 operating systems or perhaps MICROSOFT®Exchange version 5.5 communication software. Each of these software packages uses the 4.0 security descriptor specification. On the other hand, other servers such as server 206*b* may be running MICROSOFT® WINDOWS® 2000 operating system or MICROSOFT® Exchange 2000 communication software which use the Active Directory security descriptor specification.

Figure 3:
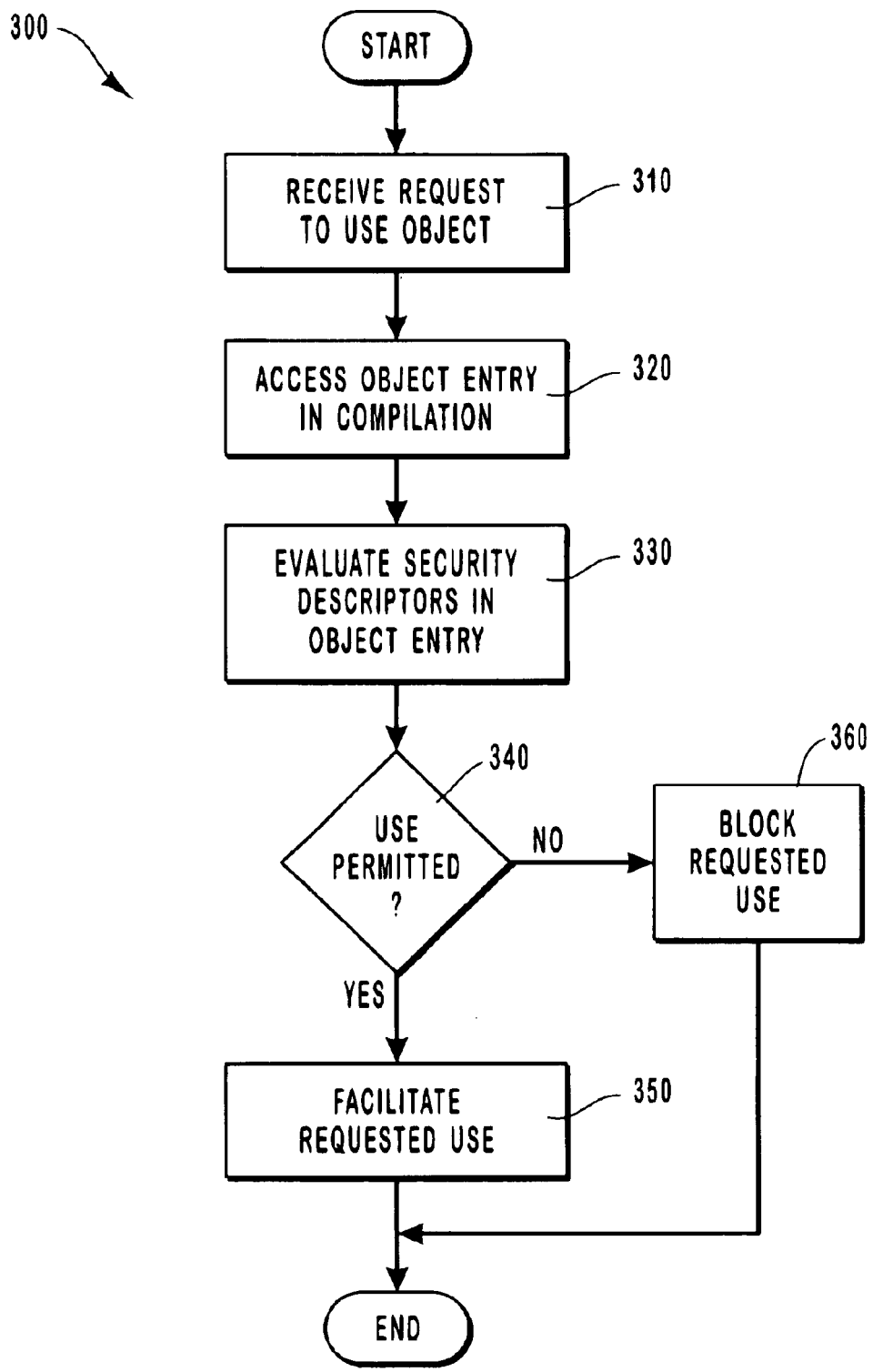
FIG. 3 is a flowchart of a method of granting or blocking a requested use of an object depending on the requesting entity's rights to use the object.

FIG. 3 is a flowchart of a method 300 for a server such as server 206*a* or 206*b* to respond to a request to use an object such as object 210 from a requesting entity such as computer systems 204. First, the server receives the use request from the requesting entity (step 310). The server then accesses the corresponding object entry (step 320). Next, the corresponding security descriptors are evaluated (step 330). If the security descriptor indicates that the requested use is permitted (YES in decision block 340), then the requested use is facilitated (step 350). Otherwise (NO in decision block 340), the requested use is blocked (step 360).

It is important that the determination of whether the requested use is permitted (decision block 340) be as consistent as possible regardless of the particular server in the server network that performs the method 300. The present invention facilitates this by allowing for an accurate linking between all security descriptors that describe a given object so that each security descriptor is as consistent as possible. The linking allows for security descriptors to be properly replicated into different security descriptor specifications. In addition, changes to any of the security descriptors that correspond to a given object are propagated to the other security descriptors that correspond to that given object.

Figure 4:
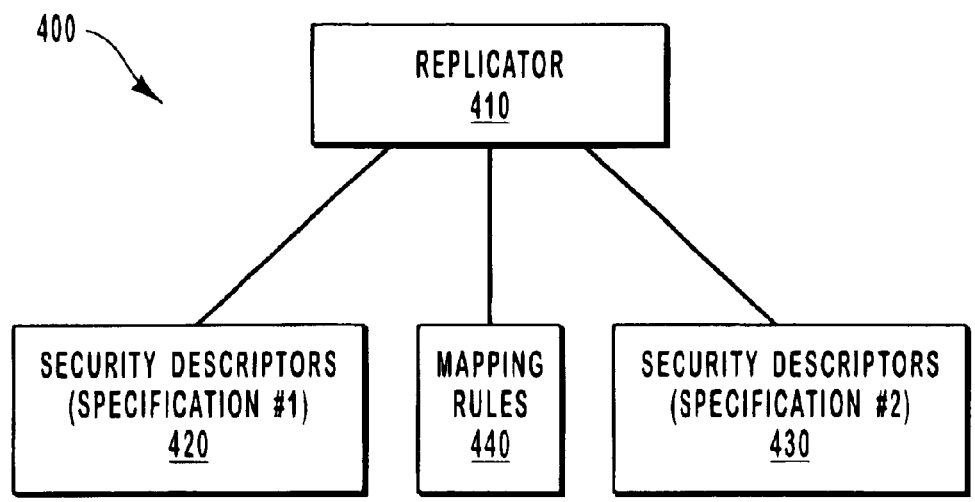
FIG. 4 is a schematic diagram of two security descriptors that follow different security descriptor specifications, but that are linked together using a converter and mapping rules.

FIG. 4 schematically illustrates a structure 400 that may accomplish this replication. The structure includes a replicator 410 that links a security descriptor 420 that follows a first security descriptor specification with a security descriptor 430 that follows a second security descriptor specification. The security descriptor may be replicated between the first and second security descriptor specifications using a mapping rules data structure 440. The mapping rules 440 define what set of one or more rights of the first security descriptor specification bi-directionally map to and from what set of one or more rights of the second security descriptor specification. These mapping rules are preferably changeable so that they can be tailored to match the given needs or different organizations.

Figure 5:
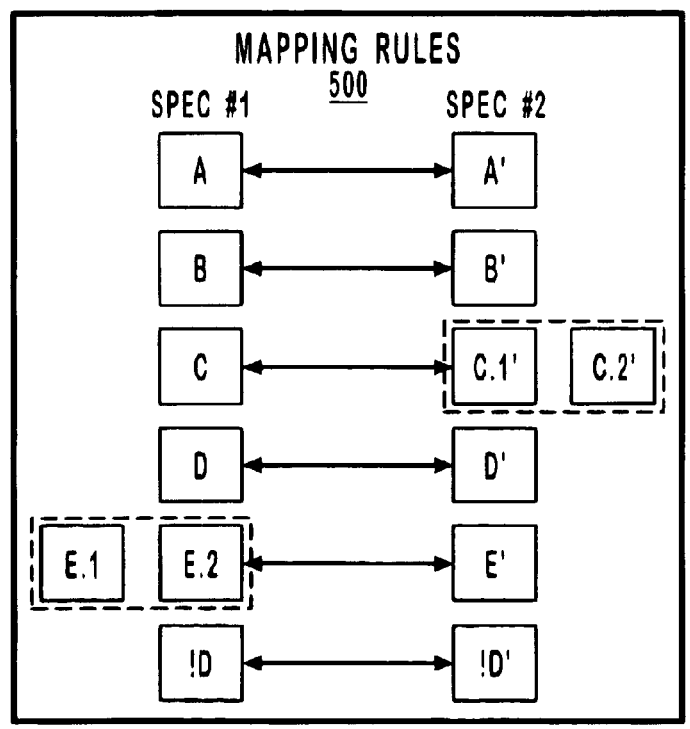
FIG. 5 illustrates a data structure that represents example mapping rules.

FIG. 5 illustrates an example 500 of mapping rules 440 in which rights of the first security descriptor specification labeled A, B, C, D, E.1, E.2 and !D under "SPEC #1" are mapped to and from corresponding rights of the second security descriptor specifications labeled A', B', C.1', C.2', D', E' and !D'. More specifically, the mapping rules 500 indicate that if right A is present in SPEC #1, then right A' should be present in SPEC #2, and vice versa. If right B is present in SPEC #1, then right B' should be present in SPEC #2, and vice versa. If right C is present in SPEC #1, then right C.1' and C.2' should both be present in SPEC #2, and vice versa. If right D is present in SPEC #1, then right D' should be present in SPEC #2, and vice versa. If rights E.1 and E.2 are both present in SPEC #1, then right E' should be present in SPEC #2, and vice versa. Finally, if right !D is present in SPEC #1, then right !D' should be present in SPEC #2.

Figure 6A:
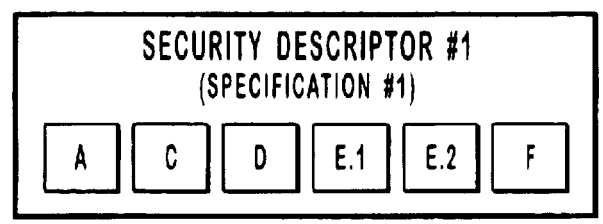
FIG. 6A illustrates a first security descriptor (security descriptor #1) that follows a first security descriptor specification (specification #2)
Figure 6B:
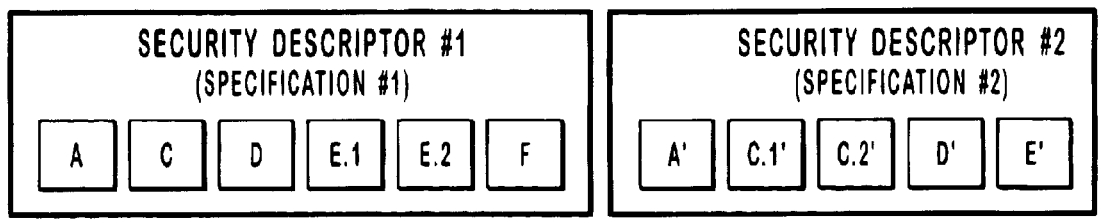
FIG. 6B illustrates the security descriptor #1 of FIG. 6A and a second security descriptor (security descriptor #2) that follows a second security descriptor specification (specification #2), the security descriptors being consistent so far as the mapping rules of FIG. 5 are concerned.

FIGS. 6A and 6B illustrate how the mapping rules 500 may be used to initially replicate a security descriptor. FIG. 6A illustrates a security descriptor that follows security descriptor specification #1. This security descriptor has rights A, C, D, E.1, E.2 and F. Note that right F is not in the mapping rules and is thus ignored when the mapping rules are applied. Using the mapping rules 500, right A maps to right A', right C maps to the combination of rights C.1' and C.2', right D maps to right D', rights E.1 and E.2 combine to map to right E', and right F does not map at all. FIG. 6B illustrates the original security descriptor that follows specification #1. In addition, the right hand side of FIG. 6B illustrates security descriptor #2 that follows the security descriptor specification #2 and that includes the rights that resulted from the mapping operation including rights A', C.1', C.2', D' and E'. Thus, the security descriptors in FIG. 6B are consistent as far as the mapping rules 500 are concerned.

Figure 7:
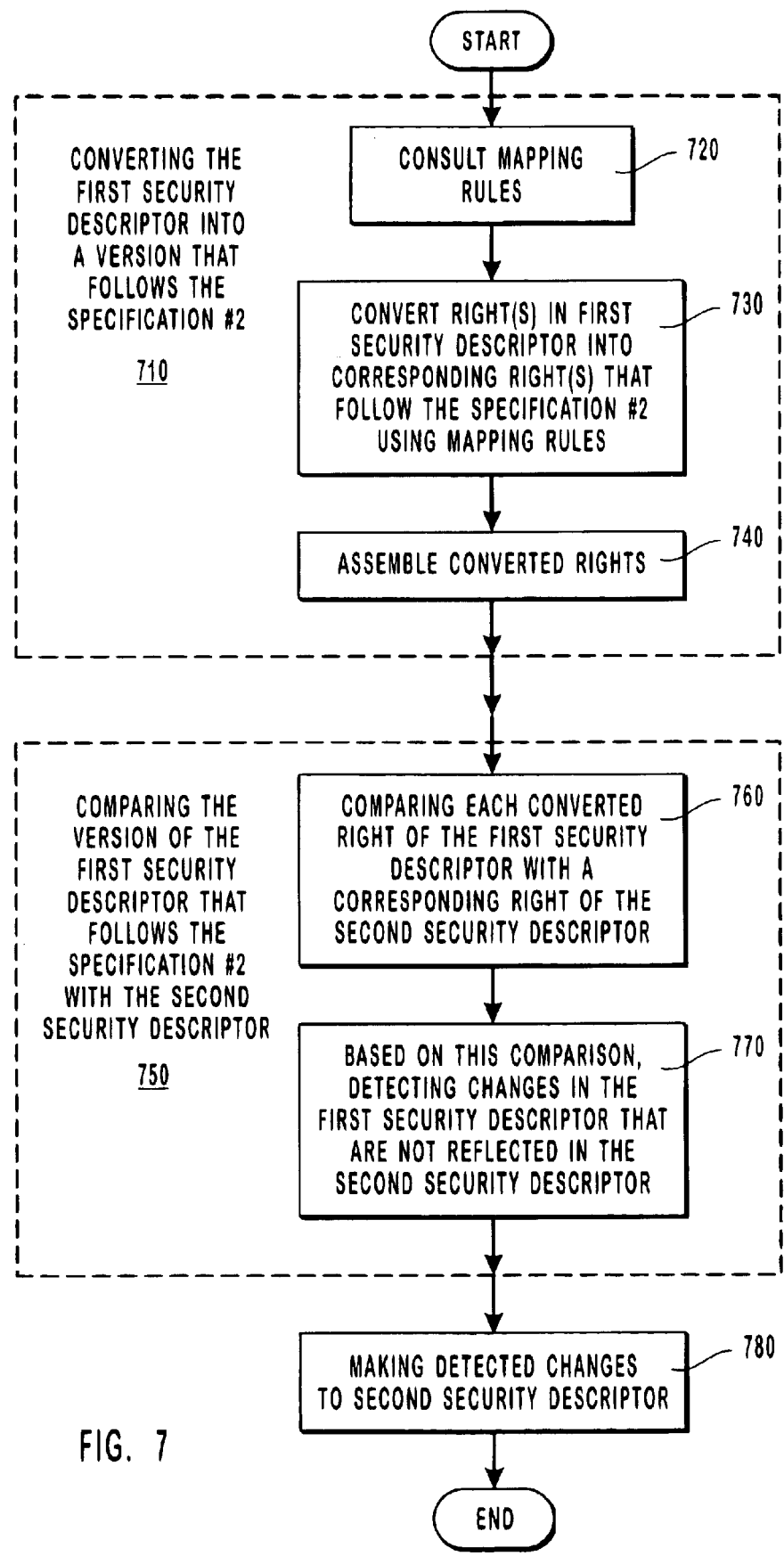
FIG. 7 is a flowchart of a method of replicating changes between security descriptors even though those security descriptors follow different security descriptor specifications.

Now that the security descriptors are consistent, any changes to one of the security descriptors are replicated to the other security descriptor. FIG. 7 illustrates a method for replicating changes in security descriptor #1 to security descriptor #2. The data structures involved with this replication are shown as they existed at instances of time sequentially beginning at FIG. 8A and ending at FIG. 8C. The method of FIG. 7 will now be described with reference to the data structures of FIGS. 8A, 8B and 8C.

Figure 8A:
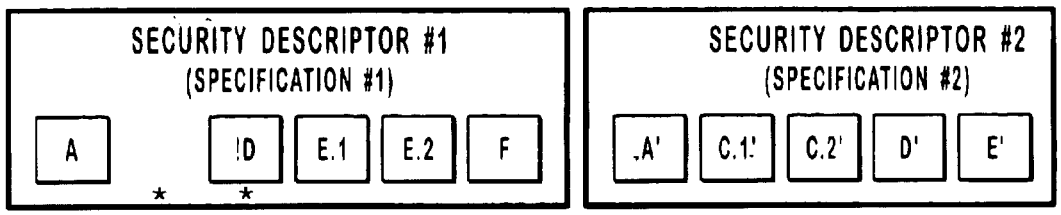
FIG. 8A illustrates the data structures of FIG. 6B in which changes have been made to the security descriptor #1.

In FIG. 8A, security descriptor #1 has changed since the time in FIG. 6B when both security descriptors were consistent. Specifically, the right C has been deleted and the right D has been changed to the right !D. These changes are each underscored by an asterisks to identify where the change took place. The method of FIG. 7 will be implement to replicate this change to the security descriptor #2 so that the security descriptor #2 may once again be consistent with the security descriptor #1 at least so far as the mapping rules 500 are concerned. The method of FIG. 7 may be executed periodically or may be executed in response to any change to one security descriptor or the other.

Figure 8B:
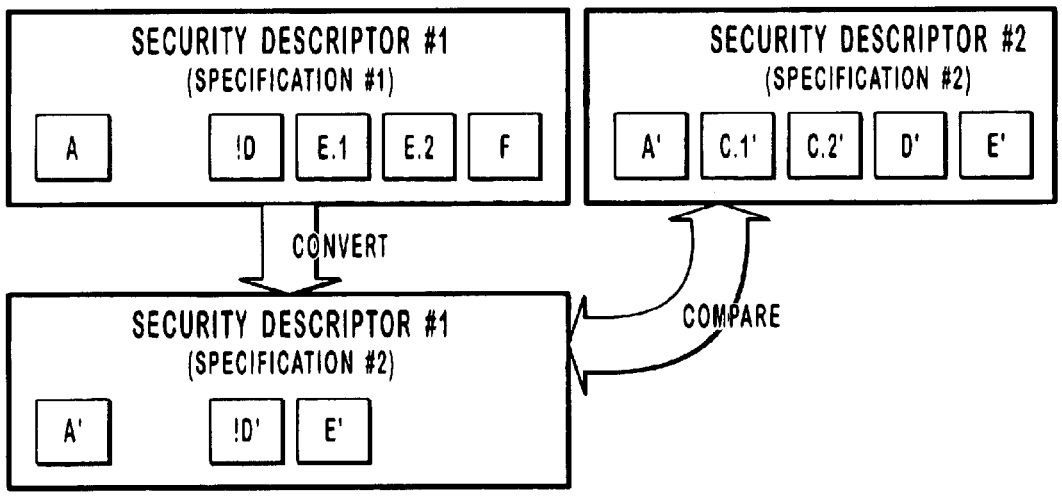
FIG. 8B illustrates the data structures of FIG. 8A in which the security descriptor #1 is used to created a converted version of the security descriptor that follows the specification #2 and which is compared with the security descriptor #2 to detect the changes to the security descriptor #1.

First, embodiments within the scope of the present invention include a step for converting security descriptor #1 that follows specification #1 into a version of the security descriptor #1 that follows specification #2 (step 710). This conversion is shown in FIG. 8B. Using the mapping rules (act 720), sets of one or more rights in the security descriptor #1 that follows the specification #1 are converted into corresponding sets of one or more rights that follow the specification #2 (act 730). Next, the converted rights are assembled (act 740) to form the version of the security descriptor #1 that follows the specification #2.

Referring to the example of FIG. 8B, the right A is mapped to the right A', the right !D is mapped to the right !D', the combination of rights E.1 and E.2 is mapped to the ght E' and the right F is not mapped at all. Thus, the version of the security descriptor #1 that follows the specification #2 is consistent with the security descriptor #1 that follows the specification #1 at least so far as the mapping rules are concerned.

Referring back to FIG. 7, embodiments within the scope of the present invention include a step for comparing the version of the security descriptor #1 that follows the specification #2 with the security descriptor #2 that follows the specification #2 (step 750). More specifically, each converted right of the version of the security descriptor #1 is compared with rights (or lack thereof) in the security descriptor #2 (act 760). Based on this comparison, changes that have been made in the security descriptor #1, but not in the security descriptor #2, are detected (act 770).

In the example of FIG. 8B, the rights A' and E' are present in both the version of the security descriptor #1 that follows the specification #2 and the security descriptor #2. However, the comparison shows that the rights C.1' and C.2' have been deleted from the security descriptor #1, and that the right D' has been changed to the right !D'.

Figure 8C:
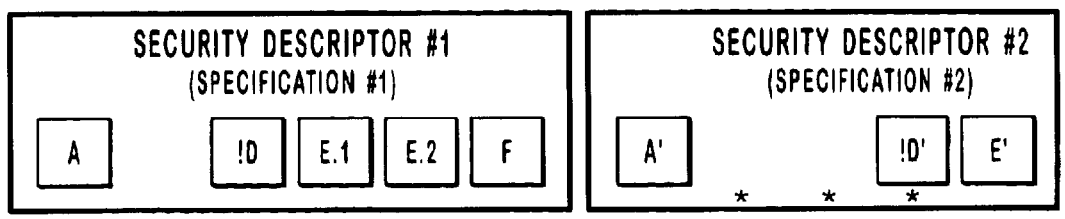
FIG. 8C illustrates the data structures of FIG. 8A in which the changes to the security descriptor #1 are replicated to the security descriptor #2.

Referring back to FIG. 7, the detected changes are then made to the security descriptor #2 (act 780). This state is represented by FIG. 8C which shows that the changes are made to the security descriptor #2 as underscored by the asterisks. This brings the security descriptors back into consistency as far as the mapping rules are concerned.

Figure 9A:
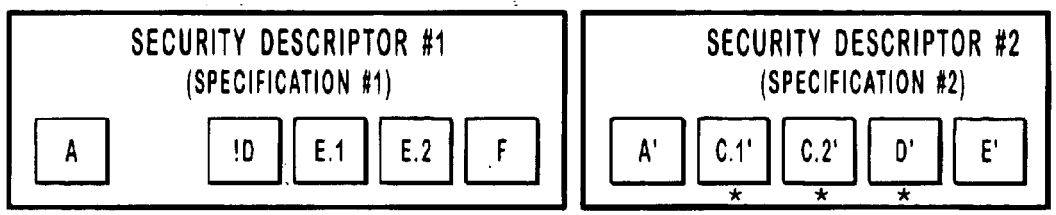
FIG. 9A illustrates the data structures of FIG. 8C in which the changes made to the security descriptor #2 are undone.

Now assume that the changes made to security descriptor #1 in FIG. 8A are now undone in the security descriptor #2 in FIG. 9A. Specifically, right C.1' and C.2' which were previously deleted from security descriptor #2 are now added back. Also, right !D'is changed back to right D' as underscored by the asterisks in the security descriptor #2 shown in FIG. 9A.

Figure 9B:
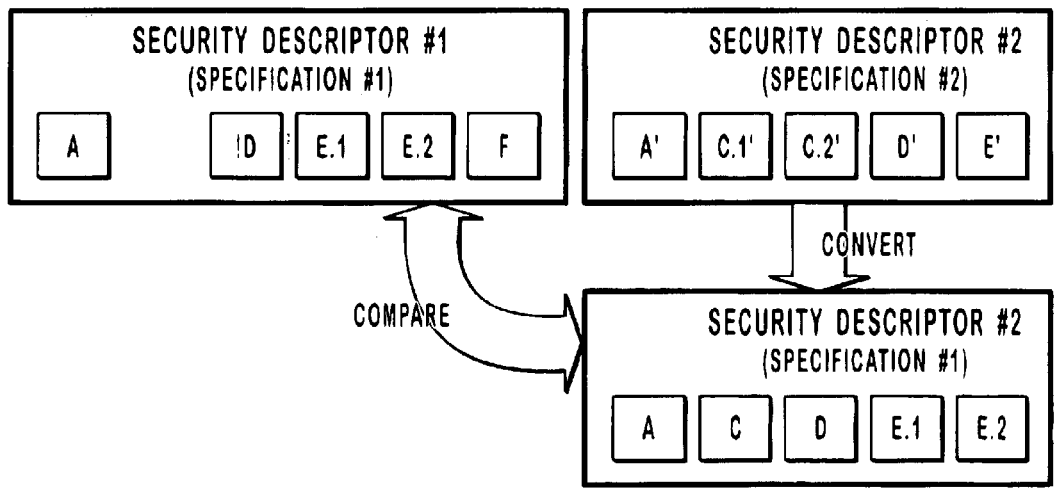
FIG. 9B illustrates the data structures of FIG. 9A in which the security descriptor #2 is used to created a converted version of the security descriptor that follows the specification #1 and which is compared with the security descriptor #1 to detect the changes to the security descriptor #2.

The method of FIG. 7 is then implemented except that changes to the security descriptor #2 are now made to replicated to the security descriptor #1. Specifically the security descriptor #2 that follows the specification #2 is converted into a version of the security descriptor #2 that follows the specification #1 as shown in FIG. 9B. Using the mapping rules, right A' maps to right A, the combination of rights C.1' and C.2' map to right C, right D' maps to right D, and right E' maps to the combination of rights E.1 and E.2 to form the version of the security descriptor #2 that follows the specification #1. Next, this version is compared to the security descriptor #1 that also follows the specification #1 to reveal that right C is added and right !D is changed to right D. These changes are then implemented in the security descriptor #1 as shown in FIG. 9C.

Figure 9C:
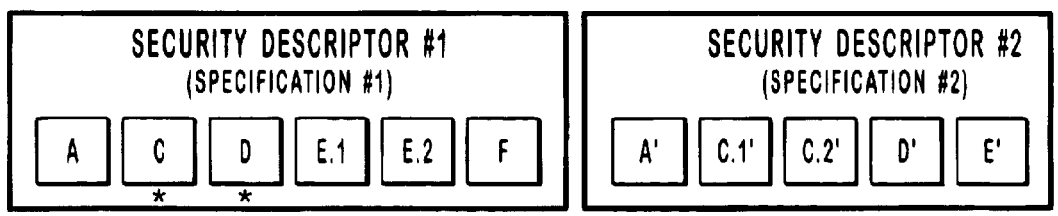
FIG. 9C illustrates the data structures of FIG. 9A in which the undoing of the changes to the security descriptor #2 are replicated to the security descriptor #1 thus returning both security descriptors to the exact state in which they existed before any changes were made.

Note that the security descriptors shown in FIG. 9C are identical to the original security descriptors shown in FIG. 6B. Thus, the replication occurs in a non-degenerative fashion. In other words, no information was lost by making the changes and then undoing the changes. The scenario in which a security descriptor is changed and then undone may occur, for example, when a network administrator makes a change to a user's security rights to an object but then realizes that the change is a mistake. The network administrator may then undo the change. However, unbeknownst to the network administrator, the change may have been implemented by the server 206a using the specification #1 while the undoing of the change may have been implemented by the server 206b using the specification #2. In this case, the network administrator surely intends for the undoing of the change to actually undo the change as though the change never occurred in the first place. The network administrator would not intend for security information to be lost by implement a change followed by an undo operation. Thus, the non-degenerative reversible nature of the method of FIG. 7 might likely be in line with consumer expectations.

The above describes a method of replicating in a non-degenerative fashion between one security descriptor specification generically labeled "specification #1" and another security descriptor specification generically labeled "specification #2". The following discussion provides an example of how the method of FIG. 7 may be implemented to replicate between the 4.0 security descriptor specification and the Active Directory security descriptor specification.

The terms "4.0 security descriptor specification" or "4.0 specification" are terms interchangeably used in this description and in the claims to refer to the security descriptor specification implemented by the MICROSOFT® WINDOWS NT® workstation 4.0 and server 4.0 operating systems. The terms "Active Directory security descriptor specification" and "Active Directory specification" are terms interchangeably used in this description and in the claims to refer to the security descriptor specification implemented by the MICROSOFT® WINDOWS® 2000 operating system.

The following Table 1 illustrates side-by-side example security descriptors that each describe security permissions related to an entity "John Doe". A 4.0 security descriptor describing security rights related to "John Doe" is provided under the heading "4.0 SD" in the left half of the page. An Active Directory security descriptor describing security rights related to "John Doe" is provided under the heading "AD SD" in the right half of the page.

TABLE 1

EXAMPLE SECURITY DESCRIPTORS

| 4.0 SD | AD SD |
| --- | --- |
| John Doe: | STANDARD |
| Send As | John Doe: |
| Receive As | Change Password |
| Modify User Attributes | Modify Personal Info |
| Boss: | Admin: |
| Receive As | Modify Personal Info |
| Network Guru: | Support: |
| Modify Admin Attributes | Reset Password |
| Admin: | MAILBOX |
| Modify User Attributes | John Doe: |
|  | Send-As |
|  | Receive-As |
|  | Boss: |
|  | Receive-As |

This 4.0 security descriptor indicates that the entity having the alias "John Doe" has the right to send electronic messages as John Doe, receive messages as John Doe, and modify user attributes associated with John Doe. Also, an entity "Boss" has the right to receive electronic messages as John Doe. Thus, messages destined for John Doe will be received by John Doe and Boss. "Network Guru" has the right to modify administration attributes associated with John Doe while "Admin" has the right to modify user attributes associated with John Doe.

The Active Directory security descriptor is divided into two categories of rights; "MAILBOX" rights that related to network communication, and "STANDARD" rights that related to other rights. The Active Directory security descriptor indicates that John Doe has the right to change his own password and modify his own personal information. Admin has the right to modify John Doe's personal information. "Support" has the right to reset John Doe's password. John Doe has the right to send electronic message as himself and receive electronic messages as himself Boss has the right to receive electronic messages as John Doe.

In order to replicate, a set of mapping rules is provided. The following TABLE 2 is an example set of mapping rules that will be applied to the above example 4.0 security descriptor and Active Directory security descriptor. Rights for the 4.0 specification are listed under the heading "4.0 SPEC" while rights for the Active Directory specification are listed under the heading "AD SPEC".

TABLE 2

MAPPING RULES

| 4.0 SPEC | | AD SPEC |
| --- | --- | --- |
| Send As | <----> | Send-As |
| Receive As | <----> | Receive-As |
| Modify User Attributes | <----> | Modify Personal Info |

These mapping rules indicates that if the "Send As" right appears in the 4.0 specification, then the "Send-As" right should appear in the Active Directory specification, and vice versa. If the "Receive As" right appears in the 4.0 specification, then the "Receive-As" right should appear in the Active Directory specification, and vice versa. If the "Modify User Attributes" right appears in the 4.0 specification, then the "Modify Personal Info" right should appear in the Active Directory specification, and vice versa.

The example security descriptors of Table 1 are consistent so far as the mapping rules of Table 2 are concerned. For example, the 4.0 security descriptor indicates that John Doe has the right to "Send As" while the Active Directory security descriptor indicates that John Doe has the right to "Send-As" which is consistent with the first mapping rule. The 4.0 security descriptor indicates that John Doe has the right to "Receive As" while the Active Directory security descriptor indicates that John Doe has the right to "Receive-As" which is consistent with the second mapping rule. The 4.0 security descriptor indicates that Boss has the right to "Receive As" while the Active Directory security descriptor indicates that Boss has the right to "Receive As" which is also consistent with the second mapping rule. The 4.0 security descriptor indicates that John Doe and Admin have the right to "Modify User Attributes" while the Active Directory security descriptor indicates that John Doe and Admin have the right to "Modify Personal Info" which is consistent with the last mapping rule.

Note that there are certain rights that are not mapped to any other rights. For example, the 4.0 specification right "Modify Admin Attributes" is not mapped to any corresponding right(s) in the Active Directory specification. Furthermore, the Active Directory rights "Change Password" and "Reset Password" are not mapped to any corresponding right(s) in the 4.0 specification. Therefore, in determining whether or not the two security descriptors are consistent, these rights are ignored.

Thus, we begin with a state in TABLE 1 in which the security descriptors are consistent as far as the mapping rules of TABLE 2 are concerned. Suppose now that the right of "Boss" to "Receive As" John Doe is removed from the 4.0 security descriptor. Before this change is replicated to the Active Directory security descriptor, the 4.0 security descriptors of Table 1 would appear as follows in Table 3.

TABLE 3

NEW 4.0 SECURITY DESCRIPTOR 4.0 SD

John Doe:
Send As
Receive As
Modify User Attributes
Network Guru:
Modify Admin Attributes TABLE 3-continued

NEW 4.0 SECURITY DESCRIPTOR 4.0 SD

Admin:
Modify User Attributes

In following the method 700 of FIG. 1, the 4.0 security descriptor that follows the 4.0 specification is converted into a version of the 4.0 security descriptor that follows the Active Directory specification (step 710). In so doing, the mapping rules of TABLE 2 are consulted (act 720) and each right(s) in the 4.0 security descriptor that follows the 4.0 specification is converted into a corresponding right(s) in the Active Directory specification (act 730). These rights are then assembled to form the version of the 4.0 specification that follows the Active Directory specification. The following Table 4 illustrates the original 4.0 security descriptor under the heading "ORIGINAL 4.0 SD" with the revised 4.0 security descriptor that follows the Active Directory specification under the heading "REVISED 4.0 SD".

TABLE 4

ORIGINAL AND REVISED 4.0 SECURITY DESCRIPTORS

| ORIGINAL 4.0 SD | REVISED 4.0 SD |
| --- | --- |
| John Doe: | STANDARD |
| Send As | John Doe: |
| Receive As | Modify Personal Info |
| Modify User Attributes | Admin: |
| Network Guru: | Modify Personal Info |
| Modify Admin Attributes | MAILBOX |
| Admin: | John Doe: |
| Modify User Attributes | Send-As |
| | Receive-As |

Note that in this conversion, the italicized right "Modify Admin Attributes" was ignored since that right has no corresponding mapping rule.

Next, the revised 4.0 security descriptor that follows the Active Directory specification is compared with the Active Directory security descriptor (step 750). In so doing, each converted right of the revised security descriptor is compared to the corresponding right in the Active Directory security descriptor (act 760) so that changes to the 4.0 security descriptor that need to be replicated to the Active Directory security descriptor can be detected (act 770). The following TABLE 5 illustrates the revised 4.0 security descriptor and the Active Directory security descriptor side-by-side.

TABLE 5

REVISED 4.0 AND ACTIVE DIRECTORY SECURITY DESCRIPTORS

| REVISED 4.0 SD | AD SD |
| --- | --- |
| STANDARD | STANDARD |
| John Doe: | John Doe: |
| | Change Password |
| Modify Personal Info | Modify Personal Info |
| Admin: | Admin: |
| Modify Personal Info | Modify Personal Info |
| | Support: |
| | Reset Password |
| MAILBOX | MAILBOX |
| John Doe: | John Doe: |

TABLE 5-continued

REVISED 4.0 AND ACTIVE DIRECTORY SECURITY DESCRIPTORS

| REVISED 4.0 SD | AD SD |
|---|---|
| Send-As | Send-As |
| Receive-As | Receive-As |
| | Boss: |
| | Receive-As |

Rights for which there are no mapping rules are italicized in TABLE 5 to emphasize that these rights are ignored when replicating using the embodiment of FIG. 7. Also, rights for which there is a mapping rule, but no corresponding right in the opposite security descriptor are highlighted in bold. For example, a right-by-right inspection of the revised 4.0 security descriptor and the Active Directory security descriptor reveals that Boss has the right to receive as John Doe in the Active Directory security descriptor, but not in the 4.0 security descriptor specification. Thus, in act 780 of FIG. 7, this right is removed from the Active Directory security descriptor.

The are several noteworthy differences between the 4.0 specification and the Active Directory specification. One difference is that the Active Directory specification has a standard portion and a mailbox portion while the 4.0 specification has no such division. Another difference is the way that the specifications represent rights.

In the 4.0 specification, the Access Control Entries (ACEs) include a field of 32 bits often called an "access mask", each bit in the access mask representing a flag that defines a certain right. If the flag is set high, that means that the right is allowed for the associated security principle. This type of ACE is often called a "standard" ACE since the ACE is not in the form of an object. In this description and in the claims, a "standard ACE" will be referred to as a "non-object ACE". For example, in the 4.0 specification, the granting of the right "Send As" is represented by a specific one of the bits in the access mask being set high. The granting of the right "Receive As", "Modify User Attributes" and "Modify Admin Attributes" are each represented by a corresponding bit in the access mask being set high.

The Active Directory specification may also include security descriptors that have "non-object" ACEs which include a similar access mask. However, in the Active Directory specification, security descriptors may also be in the form of an object that defines rights using a GUID or "Globally Unique Identifier", each GUID representing an individual right. For example, the granting of the right "Send-As" may be represented by one GUID. The granting of the right "Receive-As" may be represented by another different GUID. Since the number of GUIDs that may be used to identify rights is enormous, numerous individual rights may be defined. Thus, the Active Directory specification permits for fine-grained control over security permissions. The GUID ACEs are often referred to as "Object ACEs" since they are in the form of an object.

Figure 10:
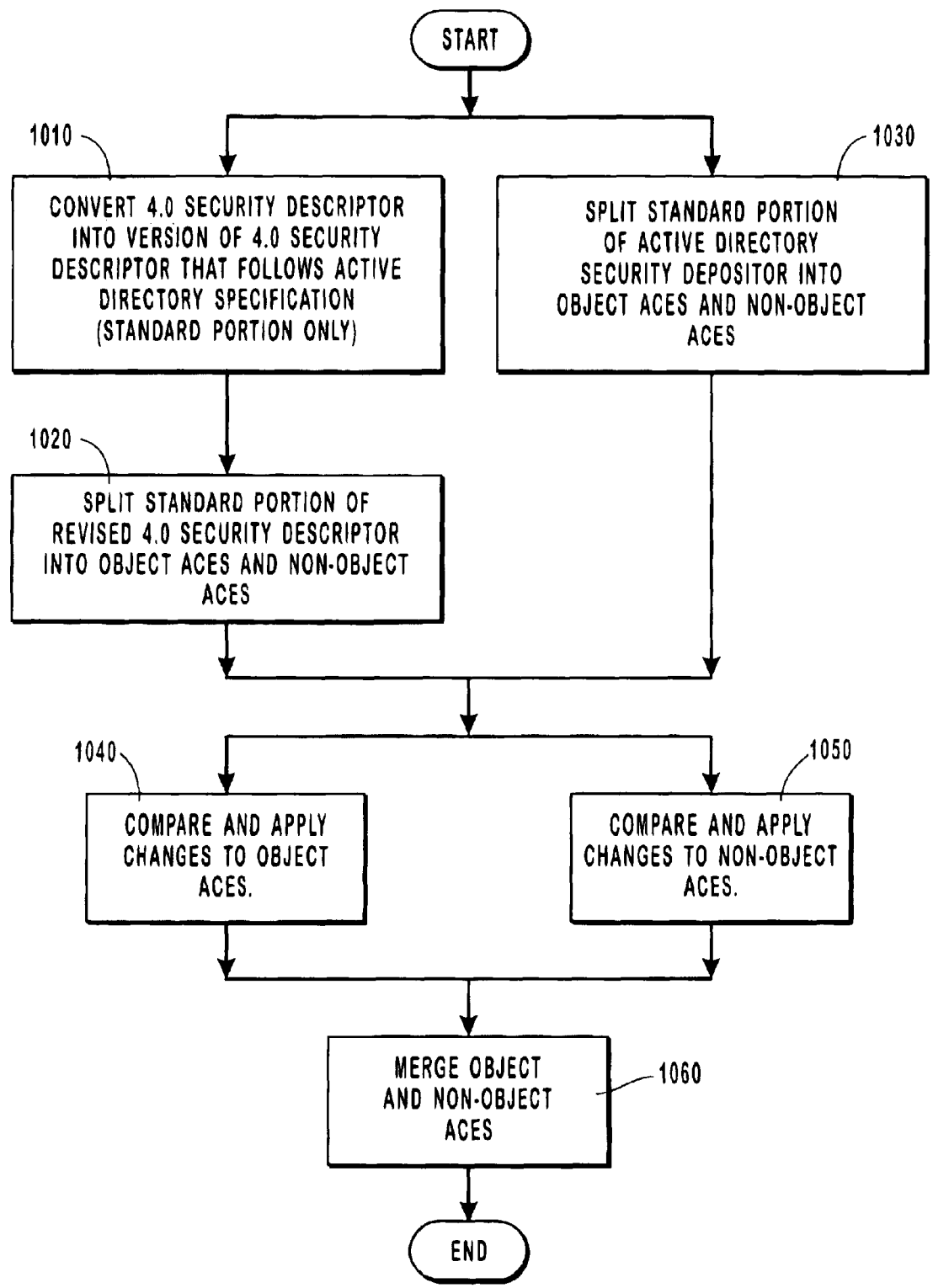
FIG. 10 more specifically illustrates a method of replicating changes to a 4.0 security descriptor to an Active Directory security descriptor.

When implementing the method of FIG. 7, these differences in the specifications are taken into consideration. FIG. 10 illustrates flowchart of how changes to a 4.0 security descriptor are replicated to an Active Directory security descriptor. The method of FIG. 10 is performed twice, once for the standard portion of the Active Directory security descriptor, and once for the mailbox portion of the Active Directory.

On the 4.0 security descriptor side, the 4.0 security descriptor is converted into a version of the 4.0 security descriptor that follows the Active Directory specification at least so far as the standard portion of the Active Directory specification is concerned (step 1010). This is accomplished using the mapping rules and corresponds to step 710 of FIG. 7. Next, the standard portion of this revised 4.0 security descriptor is split into rights that are represented as object ACEs and rights that are represented as non-object ACEs (step 1020). On the Active Directory descriptor side, the standard portion of the Active Directory security descriptor is also split into rights that are represented as object ACEs and rights that are represented as non-object ACEs (step 1030).

The object ACEs from both the revised 4.0 security descriptor and the Active Directory security descriptor are then compared and detected changes are applied to the object ACEs from the standard portion of the Active Directory security descriptor using the mapping rules (step 1040). This corresponds to step 750 and act 780 of FIG. 7. Also, the non-object ACEs from both the revised 4.0 security descriptor and the Active Directory security descriptor are then compared and detected changes are applied to the non-object ACEs from the standard portion of the Active Directory security descriptor using the mapping rules (step 1050). The non-object ACEs and the object ACEs from the standard portion of the Active Directory security descriptor are then merged to form a new standard portion of the Active Directory security descriptor (step 1060). This method is repeated for the mailbox portion of the Active Directory security descriptor.

Figure 11:
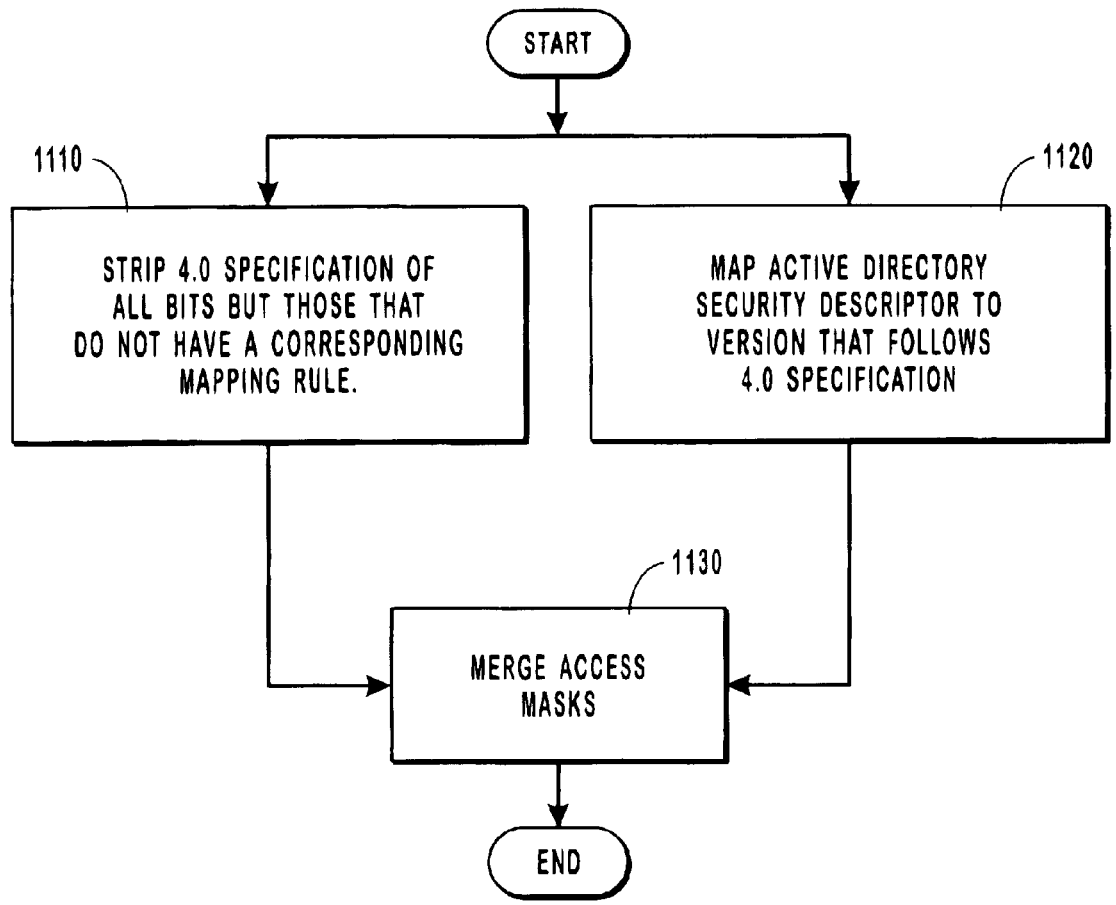
FIG. 11 more specifically illustrates a method of replicating changes to an Active Directory security descriptor to a 4.0 security descriptor.

FIG. 11 illustrates a flowchart of how changes to an Active Directory security descriptor are replicated to a 4.0 security descriptor. On the Active Directory specification side, the Active Directory security descriptor is mapped to a version of the Active Directory security descriptor that follows the 4.0 specification (step 1110). This corresponds to step 710 of FIG. 7. On the 4.0 specification side, any high bit in the 4.0 security descriptor is stripped unless the high bit does not have a corresponding mapping rule (step 1120). Next, the stripped access mask from step 1120 is merged (step 1130) with the converted access mask from step 1110 to form a new 4.0 security descriptor that is consistent with the Active Directory security descriptor at least so far as the mapping rules are concerned. In this case, the steps 750 and 780 of FIG. 7 are accomplished in combination by the combination of steps 1120 and 1130.

The principles of the present invention replicate security descriptors that follow different security descriptor specifications, thus allowing for different security descriptor specifications to describe the same object. This replication occurs through a non-degenerative mapping conversions between the first and second security specifications. Thus, data is not lost from security descriptors that follow either specification even when replicating from one specification to the other and back.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by united states Letters Patent is:

1. In a security heterogenic computer network supporting different security descriptor specifications, the computer network having one or more devices that use a first security descriptor that follows a first security descriptor specification to describe security permissions related to a particular object, the computer network also having one or more devices that use a second security descriptor that follows a second security descriptor specification to describe security permissions related to that same particular object, a method of replicating in a non-degenerative fashion the first security descriptor with the second security descriptor specification, the method facilitating the synchronization of the first and second security descriptor specifications so that both security specifications may be used in the computer network, the method comprising the following:

a step for converting the first security descriptor into a version of the first security descriptor that follows the second security descriptor specification;

a step for comparing the converted version of the first security descriptor that follows the second security descriptor specification with the second security descriptor;

an act of changing the second security descriptor to reflect at least one security permission change as represented in the converted version of the first security descriptor so that any changes to the second security descriptor are non-degenerative and reversible;

an act of undoing the at least one security permission change in the second security descriptor;

a step for converting the second security descriptor into a version of the second security descriptor that follows the first security descriptor specification;

a step for comparing the converted version of the second security descriptor that follows the first security descriptor specification with the first security descriptor; and an act of changing the first security descriptor to reflect the undone permission change as represented in the converted version of the second security descriptor so that any change to the first security descriptor is non-degenerative and reversible.

2. A method in accordance with claim 1, wherein the first security descriptor specification is the 4.0 specification.

3. A method in accordance with claim 2, wherein the second security descriptor specification is the Active Directory specification.

4. A method in accordance with claim 1, wherein the first security descriptor specification is the Active Directory specification.

5. A method in accordance with claim 4, wherein the second security descriptor specification is the 4.0 specification.

6. A method in accordance with claim 1, wherein the step for converting the first security descriptor that follows the first security descriptor specification into a version of the first security descriptor that follows the second security descriptor specification comprises the following:

an act of consulting mapping rules that define mappings of rights of the first security descriptor specification to rights of the second security descriptor specification;

for each right for which there is a corresponding mapping rule, converting the right that follows the first security descriptor specification to a corresponding right that follows the second security descriptor specification; and an act of assembling each corresponding right that follows the second security descriptor specification to form a version of the first security descriptor that follows the second security descriptor specification.

7. A method in accordance with claim 1, wherein the step for comparing the converted version of the first security descriptor that follows the second security descriptor specification with the second security descriptor that also follows the second security descriptor specification comprises the following:

for each right for which there is a corresponding mapping rule, an act of comparing the right in the version of the first security descriptor that follows the second security descriptor specification to the right in the second security descriptor; and based on the act of comparing, an act of detecting changes in the first security descriptor that are not reflected in the second security descriptor.

8. In a security heterogenic computer network supporting different security descriptor specifications, the computer network having one or more devices that use a first security descriptor that follows a first security descriptor specification to describe security permissions related to a particular object, the computer network also having one or more devices that use a second security descriptor that follows a second security descriptor specification to describe security permissions related to that same particular object, a method of replicating in a non-degenerative fashion the first security descriptor with the second security descriptor specification, the method facilitating the synchronization of the first and second security descriptor specifications so that both security specifications may be used in the computer network, the method comprising the following:

an act of consulting mapping rules that define mappings of rights between the first security descriptor specification and the second security descriptor specification;

for each right of the first security descriptor specification for which there is a corresponding mapping rule, converting the right that follows the first security descriptor specification to a corresponding right that follows the second security descriptor specification;

an act of assembling each converted right that follows the second security descriptor specification to form a version of the first security descriptor that follows the second security descriptor specification;

an act of comparing each converted right in the version of the first security descriptor that follows the second security descriptor specification to the corresponding right in the second security descriptor;

based on the act of comparing each converted right in the version of the first security descriptor that follows the second security descriptor specification, an act of detecting one or more changes in the converted first security descriptor that are not reflected in the second security descriptor;

an act of changing the second security descriptor to reflect the detected one or more changes in the first security descriptor so that changes to the second security descriptor are non-degenerative and reversible;

an act of changing one or more rights in the second security descriptor;

for each right of the second security descriptor specification for which there is a corresponding mapping rule, converting the right that follows the second security descriptor specification to a corresponding right that follows the first security descriptor specification;

an act of assembling each converted right that follows the first security descriptor specification to form a version of the second security descriptor that follows the first security descriptor specification;

an act of comparing each converted right in the version of the second security descriptor that follows the first security descriptor specification to the corresponding right in the first security descriptor;

based on the act of comparing each converted right in the version of the second security descriptor that follows the first security descriptor specification, an act of detecting one or more changes in the converted second security descriptor that are not reflected in the first security descriptor; and an act of changing the first security descriptor to reflect the detected one or more changes in the second security descriptor so that changes to the first security descriptor are non-degenerative and reversible.

9. A method in accordance with claim 8, wherein the first security descriptor specification is the 4.0 specification.

10. A method in accordance with claim 9, wherein the second security descriptor specification is the Active Directory specification.

11. A method in accordance with claim 8, wherein the first security descriptor specification is the Active Directory specification.

12. A method in accordance with claim 11, wherein the second security descriptor specification is the 4.0 specification.

13. A computer program product for use in a security heterogenic computer network supporting different security descriptor specifications, the computer network having one or more devices that use a first security descriptor that follows a first security descriptor specification to describe security permissions related to a particular object, the computer network also having one or more devices that use a second security descriptor that follows a second security descriptor specification to describe security permissions related to that same particular object, the computer program product for implementing a method of replicating in a non-degenerative fashion the first security descriptor with the second security descriptor specification, the method facilitating the synchronization of the first and second security descriptor specifications so that both security specifications may be used in the computer network, the computer program product comprising a computer-readable medium having computer-executable instructions for performing the following:

a step for converting the first security descriptor into a version of the first security descriptor that follows the second security descriptor specification;

a step for comparing the converted version of the first security descriptor that follows the second security descriptor specification with the second security descriptor;

an act of changing the second security descriptor to reflect at least one security permission change as represented in the converted version of the first security descriptor so that change to the second security descriptor is non-degenerative and reversible;

an act of changing the second security descriptor;

a step for converting the second security descriptor into a version of the second security descriptor that follows the first security descriptor specification;

a step for comparing the converted version of the second security descriptor that follows the first security descriptor specification with the first security descriptor; and an act of changing the first security descriptor to reflect the change to the second security descriptor so that change to the first security descriptor is non-degenerative and reversible.

14. A computer program product in accordance with claim 13, wherein the first security descriptor specification is the 4.0 specification.

15. A computer program product in accordance with claim 14, wherein the second security descriptor specification is the Active Directory specification.

16. A computer program product in accordance with claim 14, wherein the first security descriptor specification is the Active Directory specification.

17. A computer program product in accordance with claim 16, wherein the second security descriptor specification is the 4.0 specification.

18. A computer program product in accordance with claim 13, wherein the computer-executable instructions for performing the step for converting the first security descriptor that follows the first security descriptor specification into a version of the first security descriptor that follows the second security descriptor specification comprise computer-executable instructions for performing the following:

an act of consulting mapping rules that define mappings of rights of the first security descriptor specification to rights of the second security descriptor specification;

for each right for which there is a corresponding mapping rule, converting the right that follows the first security descriptor specification to a corresponding right that follows the second security descriptor specification; and an act of assembling each corresponding right that follows the second security descriptor specification to form a version of the first security descriptor that follows the second security descriptor specification.

19. A computer program product in accordance with claim 13, wherein the computer-executable instructions for performing the step for comparing the converted version of the first security descriptor that follows the second security descriptor specification with the second security descriptor that also follows the second security descriptor specification comprise computer-executable instructions for performing the following:

for each right for which there is a corresponding mapping rule, an act of comparing the right in the version of the first security descriptor that follows the second security descriptor specification to the right in the second security descriptor; and based on the act of comparing, an act of detecting changes in the first security descriptor that are not reflected in the second security descriptor.

20. A computer program product for use in a security heterogenic computer network supporting different security descriptor specifications, the computer network having one or more devices that use a first security descriptor that follows a first security descriptor specification to describe security permissions related to a particular object, the computer network also having one or more devices that use a second security descriptor that follows a second security descriptor specification to describe security permissions related to that same particular object, a computer program product for implementing a method of replicating in a non-degenerative fashion the first security descriptor with the second security descriptor specification, the method facilitating the synchronization of the first and second security descriptor specifications so that both security specifications may be used in the computer network, the computer program product comprising a computer-readable medium having computer-executable instructions for performing the following:

an act of consulting mapping rules that define mappings of rights between the first security descriptor specification and the second security descriptor specification;

for each right of the first security descriptor specification for which there is a corresponding mapping rule, converting the right that follows the first security descriptor specification to a corresponding right that follows the second security descriptor specification;

an act of assembling each converted right that follows the second security descriptor specification to form a version of the first security descriptor that follows the second security descriptor specification;

an act of comparing each converted right in the version of the first security descriptor that follows the second security descriptor specification to the corresponding right in the second security descriptor;

based on the act of comparing each converted right in the version of the first security descriptor that follows the second security descriptor specification, an act of detecting one or more changes in the converted first security descriptor that are not reflected in the second security descriptor;

an act of changing the second security descriptor to reflect the detected one or more changes in the first security descriptor so that any changes to the second security descriptor are non-degenerative and reversible;

an act of undoing the change to the second security descriptor;

for each right of the second security descriptor specification for which there is a corresponding mapping rule, converting the right that follows the second security descriptor specification to a corresponding right that follows the first security descriptor specification;

an act of assembling each converted right that follows the first security descriptor specification to form a version of the second security descriptor that follows the first security descriptor specification;

an act of comparing each converted right in the version of the second security descriptor that follows the first security descriptor specification to the corresponding right in the first security descriptor;

based on the act of comparing each converted right in the version of the second security descriptor that follows the first security descriptor specification, an act of detecting one or more changes in the converted second security descriptor that are not reflected in the first security descriptor; and an act of changing the first security descriptor to reflect the detected one or more changes in the second security descriptor so that any changes to the first security descriptor are non-degenerative and reversible.

21. A computer program product in accordance with claim 20, wherein the first security descriptor specification is the 4.0 specification.

22. A computer program product in accordance with claim 21, wherein the second security descriptor specification is the Active Directory specification.

23. A computer program product in accordance with claim 20, wherein the first security descriptor specification is the Active Directory specification.

24. A computer program product in accordance with claim 23, wherein the second security descriptor specification is the 4.0 specification.

25. A computer system comprising the following:

a processing device; and a combination of one or more computer-readable media which in combination have stored thereon the following:

a first data structure that represents a first security descriptor that follows a first security descriptor specification and that represents an object;

a second data structure that represents a second security descriptor that follows a second security descriptor specification and that also represents the object;

a third data structure that represent mapping rules that correlate sets of one or more rights of the first security descriptor specification which sets of one or more rights of the second security descriptor specification; and computer-executable instruction that, when executed by the processor, perform the following:

a step for converting the first security descriptor into a version of the first security descriptor that follows the second security descriptor specification;

a step for comparing the converted version of the first security descriptor that follows the second security descriptor specification with the second security descriptor;

an act of changing the second security descriptor to reflect at least one change as represented in the converted version of the first security descriptor so that change to the second security descriptor is non-degenerative and reversible;

an act of changing the second security descriptor;

a step for converting the second security descriptor into a version of the second security descriptor that follows the first security descriptor specification;

a step for comparing the converted version of the second security descriptor that follows the first security descriptor specification with the first security descriptor; and an act of changing the first security descriptor to reflect the change to the second security descriptor so that change to the first security descriptor is non-degenerative and reversible.

* * * * *